J. SHETLER.
PORTABLE WOOD SAWING MACHINE.
APPLICATION FILED SEPT. 9, 1916.
1,246,667.
Patented Nov. 13, 1917.
2 SHEETS—SHEET 2.
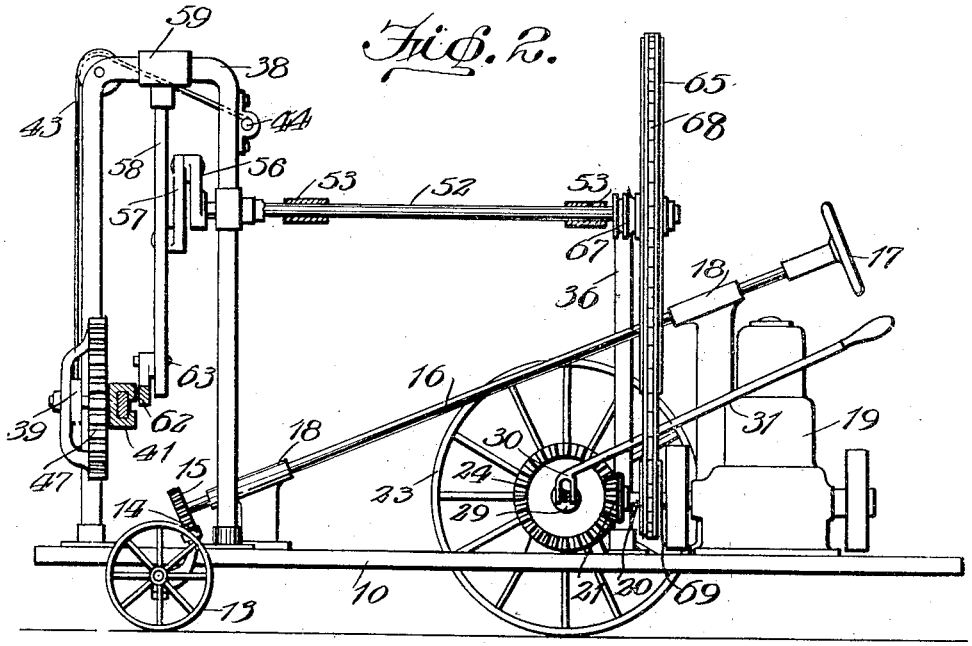
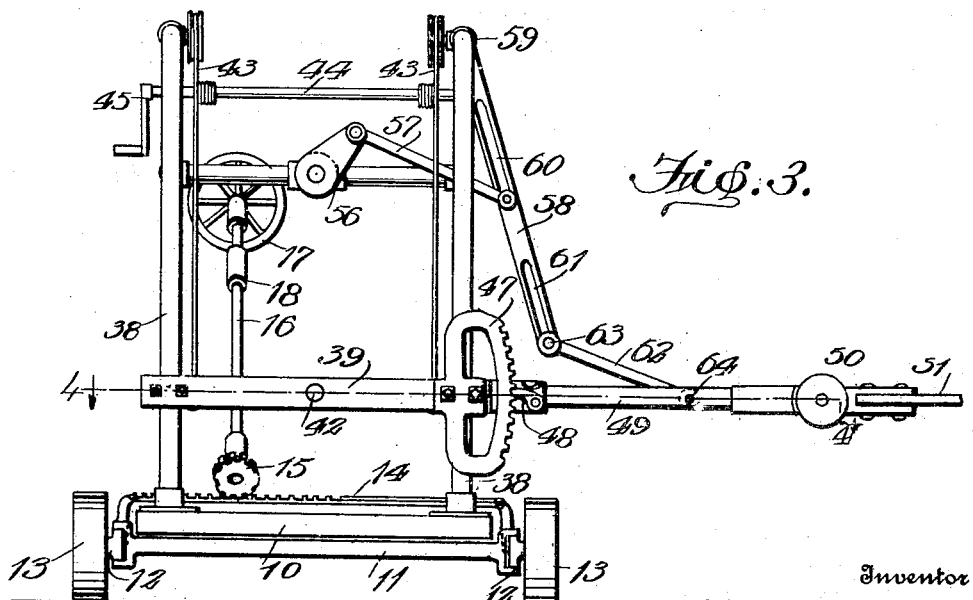
Inventor
John Shetler,
By Geo. S. Kimmel.
Attorney

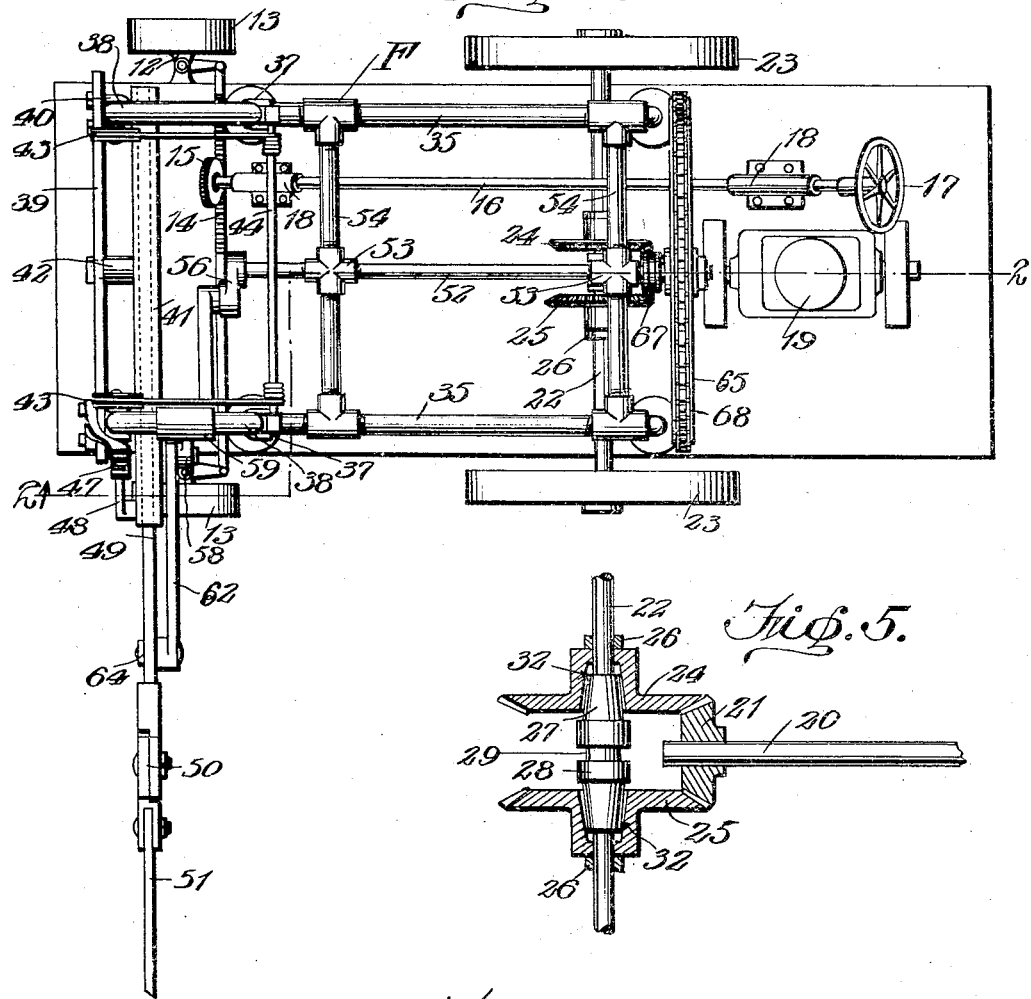

UNITED STATES PATENT OFFICE.

JOHN SHETLER, OF DUBUQUE, IOWA.

PORTABLE WOOD-SAWING MACHINE.

1,246,667.  Specification of Letters Patent.  Patented Nov. 13, 1917.

Application filed September 9, 1916. Serial No. 119,244.

*To all whom it may concern:*

Be it known that I, JOHN SHETLER, a citizen of the United States, and resident of Dubuque, in the county of Dubuque and State of Iowa, have invented certain new and useful Improvements in Portable Wood-Sawing Machines, of which the following is a specification.

The present invention relates to the class of wood-sawing and has particular reference to new and useful improvements in self-propelled sawing machines.

The primary object of my invention is to provide a simple, strong and durable and easily operated portable wood-sawing machine which may be cheaply manufactured.

Another object of my invention is to provide a wood-sawing machine of the class described having self-propelling means associated therewith in the form of a prime-mover such as a gasolene engine or the like, a system of gearing being provided whereby when desired the prime-mover may be utilized for operating the saw.

Other objects and advantages to be derived from the use of my improved wood-sawing machine will appear from the following detailed description and the claims, taken with an inspection of the accompanying drawings, in which:—

Figure 1 is a top plan view of a wood-sawing machine embodying the improvements of my invention;

Fig. 2 is a side elevational view of the same, partly in section on the line 2—2 of Fig. 1;

Fig. 3 is a front end elevational view of the same, parts of the driving mechanism being omitted;

Fig. 4 is a fragmental longitudinal sectional view of the saw-carriage and saw taken on line 4—4 of Fig. 3; and Fig. 5 is an enlarged detailed sectional view of a clutch mechanism for use in connection with the driving of the machine.

Referring more particularly to the drawings, wherein similar characters of reference designate like and corresponding parts throughout the various views, 10 designates the base or chassis of the portable sawing machine of my invention, said chassis being mounted on a front axle 11, having stub axles 12 carrying steering wheels 13. A transverse rack bar 14 connects with the stub axles, said rack bar meshing with a pinion 15 carried by the steering post 16, said steering post having a wheel 17 on the upper free end thereof. The steering post is mounted in bearings 18.

The prime-mover includes an internal combustion engine 19, of any approved construction, the crank shaft 20 thereof having a bevel pinion 21 on the free end. The rear driving axle is designated 22 and carries driving wheels 23 on the free ends thereof. A pair of bevel gears 24 and 25 are loosely mounted upon the shaft 22, said bevel gears continually meshing with the pinion 21. Collars 26 prevent movement of the gears 24 along the shaft, said collars being supported on the chassis 10. A pair of cones 27 and 28 are carried by the axle 22, said axle being enlarged between the cones and formed with an annular groove 29. The bifurcated end 30 of a shifting lever 31 is engaged in the annular groove 29 and extends to a point adjacent the steering wheel 17. It will be seen that when the lever 31 is shifted one or the other of the cones 27 and 28 will engage the gears 24 or 25 as the case may be, the gears being provided with tapering recesses 32 to receive the cones. In view of the fact that the directions of rotation of the gears 24 and 25 are opposite a forward or reverse motion may be imparted to the axle 22 as desired.

The sawing mechanism of my invention is mounted upon a frame F embodying side bars 35 carried on standards 36 at their rear ends, and connected at 37 to U-shaped standards 38 at the forward end of the frame. The standards 36 and 38 are mounted on the chassis 10.

The saw carriage includes a bar 39 connected with the forward portions of the standards 38 by U-bolts 40. A cross-head guide 41 is pivoted at 42 on the bar 39, said cross-head guide projecting beyond one side of the machine. A plurality of cables 43 connected with the bar 39 are trained over a shaft 44 having a crank 45 on one free end thereof. The cables serve to raise and lower the saw carriage. An arcuate rack member 47 is carried by the bar 39, one of the U-bolts 40 being engaged with said rack to maintain the same rigidly on the bar. A spring pressed pawl 48 is provided and serves to engage the rack bar, said pawl being carried by the cross-head guide 41.

The saw carrying frame or cross-head is designated 49 and is in the form of a bar slidable in the cross-head guide 41, the outer free ends of the cross-head 49 having an adjustable clamp 50 for supporting the saw blade 51.

I provide means for reciprocating the cross-head 49, said means including a shaft 52 mounted in bearings 53 carried by transverse bars 54 connecting said side bars 35. A crank 56 is mounted on the forward end of the shaft 52, said crank being connected by means of a rod 57 to a rocker arm 58, said rocker arm being pivoted at 59 on the top portion of one of the standards 38. The connection between the connecting rod 57 and the rocker arm 58 is made adjustable by means of the slot 60. A slot 61 is provided in the lower end of the rocker arm 58, a connecting rod 62 being connected through said slot as at 63 and its opposite free ends pivotally connected at 64 to the cross-head 49.

A relatively large sprocket wheel 65 is loosely mounted on the rear end of the shaft 52, a clutch 67 serving to connect the shafts with said sprocket wheels, at times. A chain 68 is trained over the sprocket wheel and engages a relatively smaller sprocket wheel 69 carried by the crank shaft 20 of the engine.

In use assuming that it is desired to move the sawing machine from one place to another, the clutch 67 is disconnected and the lever shifted to operate the cones 27 or 28 to move the same into engagement with either of their respective gears. This will serve to drive this machine forward or backward as desired.

When a tree or the like has been reached and it is desired to cut down the same the lever 31 is permitted to remain in the neutral position and the clutch 67 is thrown in. This will cause the saw to reciprocate against the tree in a horizontal plane performing the cutting operation. In Fig. 1 the saw has been shown in vertical position, it being apparent that when desired, logs lying upon the ground may be cut. The angle of the saw may be changed by adjusting the cross-head guide angularly on the pivot 42 by means of the rack 47. The stroke of the saw may be adjusted by changing the position of the connecting rods 57 and 62 in the rocker arm 58. The saw carriage may be raised or lowered by means of the crank 45. While cutting, one or the other of the cones may be gradually engaged with the driving axle, in this manner feeding the saw to the work. Of course, it is essential when performing the sawing operation that the feed be as level as possible, but this may be easily accomplished by placing several planks beneath the wheels on the ground and allowing the machine to run upon the same when performing a cutting operation. I desire to lay particular stress upon the extreme flexibility of my improved sawing machine, the device being light in construction and easily handled by one man. The sawing machine will reach any spot in a forest that is accessible to other machines and may reach positions which cannot be reached by more cumbersome devices.

From the above description taken in connection with the accompanying drawings, it is thought that a clear and comprehensive understanding of the construction, operation and advantages of my invention may be had, and while I have shown and described the device as embodying a specific structure, I desire that it be understood that such changes may be made in said structure as do not depart from the spirit and scope of the invention as claimed.

Having thus fully described my invention, what I claim as new and desire to secure by Letters Patent, is:—

1. A portable sawing machine comprising a base, a pair of upright supports on said base, a horizontally extending bar slidably mounted on said supports, means carried by the supports for vertically adjusting said bar, an arcuate rack on one end of the bar, a cross-head holder disposed on the opposite side of said supports from which the bar is mounted, a centrally disposed pivot connecting said bar and holder, a spring pressed pawl carried by the holder and adapted for engagement with the rack, a cross-head carrying a saw reciprocably mounted in said holder, an operating shaft, and a crank carried by said shaft and connected with the cross-head.

2. A portable sawing machine including a base, a pair of spaced longitudinally extended U-shaped supports mounted on the base, a saw carriage slidably and pivotally connected with the front arms of said arms of said supports, a saw reciprocably mounted in said carriage, an operating shaft, a crank on the forward end of said shaft disposed between the supports, a swinging arm mounted on the inverted base portion of one of said supports, a pair of rods connecting the lower portion of said arm and the saw and upper portion of the arm and the crank respectively, and said rods being adjustably connected with the arms.

In testimony whereof, I affix my signature hereto.

JOHN SHETLER.

Copies of this patent may be obtained for five cents each, by addressing the "Commissioner of Patents, Washington, D. C."